(12) United States Patent
Boulet et al.

(10) Patent No.: US 11,813,563 B2
(45) Date of Patent: *Nov. 14, 2023

(54) ADSORPTIVE GAS SEPARATION PROCESS AND SYSTEM

(71) Applicant: Inventys Thermal Technologies Inc., Burnaby (CA)

(72) Inventors: Andre Boulet, Bowen Island (CA); Soheil Khiavi, North Vancouver (CA)

(73) Assignee: Svante Inc., Burnaby (CA)

( * ) Notice: Subject to any disclaimer, the term of this patent is extended or adjusted under 35 U.S.C. 154(b) by 127 days.

This patent is subject to a terminal disclaimer.

(21) Appl. No.: 17/465,069

(22) Filed: Sep. 2, 2021

(65) Prior Publication Data

US 2021/0394111 A1    Dec. 23, 2021

Related U.S. Application Data

(62) Division of application No. 16/089,708, filed as application No. PCT/CA2017/050393 on Mar. 31, 2017, now Pat. No. 11,148,094.

(60) Provisional application No. 62/316,426, filed on Mar. 31, 2016.

(51) Int. Cl.
*B01D 53/047* (2006.01)
*B01D 53/00* (2006.01)
*B01D 53/04* (2006.01)
*B01D 53/26* (2006.01)

(52) U.S. Cl.
CPC ....... *B01D 53/0476* (2013.01); *B01D 53/002* (2013.01); *B01D 53/0462* (2013.01); *B01D 53/261* (2013.01); *B01D 2257/102* (2013.01); *B01D 2257/504* (2013.01); *B01D 2257/80* (2013.01); *B01D 2258/0283* (2013.01); *B01D 2259/4009* (2013.01); *B01D 2259/40056* (2013.01)

(58) Field of Classification Search
None
See application file for complete search history.

(56) References Cited

U.S. PATENT DOCUMENTS 11,148,094 B2 * 10/2021 Boulet ................. B01D 53/06
2014/0175336 A1 * 6/2014 Gupta ................. B01D 53/06
585/824

* cited by examiner

*Primary Examiner* — Jason M Greene
(74) *Attorney, Agent, or Firm* — Voyer Law (57) ABSTRACT

An adsorptive gas separation process and system is provided for separating at least a first component from a multi-component fluid mixture, or specifically for separating carbon dioxide from a combustion gas stream. The adsorptive gas separation process comprises an adsorbing step, a first regenerating step, an optional second regenerating step and an optional conditioning step.

12 Claims, 3 Drawing Sheets

ADSORPTIVE GAS SEPARATION PROCESS AND SYSTEM

1. TECHNICAL FIELD

The present invention relates generally to methods for adsorptive gas separation of a multi-component fluid mixture and systems therefore. More particularly, the present invention relates to methods for adsorptive gas separation of carbon dioxide from a combustion gas stream and systems incorporating the same.

2. BACKGROUND OF THE INVENTION

Adsorptive gas separation processes and systems, for example, temperature swing adsorption, pressure swing adsorption and partial pressure swing adsorption, are known in the art for use in adsorptive gas separation of multi-component fluid mixtures. One type of industrial process where gas separation may be desirable includes combustion processes, for example, where an oxidant and a carbon-containing fuel are combusted generating at least heat and a combustion gas stream (also known as a combustion flue gas stream). The separation of at least one component from the combustion gas stream may be desirable, including for example, post-combustion gas separation of carbon dioxide, but offer several challenges including, for example, but not limited to that the volume of gas to be treated for separation may be large, the combustion gas stream may contain dilute amounts of the target component desired to be separated, and/or the combustion gas stream may be supplied at a low pressure.

A conventional temperature swing adsorptive gas separation process may typically employ two fundamental steps, an adsorption step and a regeneration step. During a typical adsorption step, a feed stream such as a multi-component fluid mixture may be admitted into an adsorptive separation system and contactor comprising an adsorbent material, where the adsorbent material may adsorb a component of the feed stream, separating the adsorbed component from the remaining components of the feed stream. During a typical subsequent regeneration step, a fluid stream, for example, a heated fluid stream, may be admitted into the adsorptive separation system and contactor to increase the temperature of the adsorbent material, causing at least a portion of the adsorbed components to release from the adsorbent material, and allow for cyclic reuse of the adsorbent material. In some conventional systems and methods, an optional cooling or conditioning step may be employed to decrease the temperature of the adsorbent material after the regeneration step, to assist in restoring the adsorptive capacity of the adsorbent material prior to a subsequent adsorption step. A coolant or conditioning stream, for example, an air stream at near ambient temperatures, may be admitted into the adsorptive separation system and contactor to decrease the temperature of the adsorbent material. The adsorption, regeneration and conditioning steps may then be sequentially repeated.

In conventional adsorptive gas separation processes and systems, energy consumed for regeneration of adsorbent material may typically represent a large portion of the operating cost of such systems and processes, and such costs may typically act as barriers to wide adaptation and implementation of conventional adsorptive gas separation technology. Conventional adsorptive gas separation processes and systems employing steam as an exemplary regeneration stream to cause desorption of one or more components from an adsorbent material may undesirably consume and reduce the quantity of steam high in exergy which may be utilized for other processes in an industrial application, resulting in a reduction in the overall efficiency and increasing the operating cost of an integrated adsorptive gas separation process and system. Furthermore, when employing steam as an exemplary regeneration stream to cause desorption of one or more components from an adsorbent material, steam may undesirably condense and adsorb on the adsorbent material, which may undesirably reduce the adsorbent capacity of the adsorbent material and/or increase the energy consumption for removal of the condensed steam, resulting in increasing the operating cost of an adsorptive gas separation process and system. Accordingly, an adsorptive gas separation process and system which may desirably address one or more of the shortcomings of conventional processes and systems is desired.

3. SUMMARY OF THE INVENTION

In various embodiments according to the present disclosure, an adsorptive gas separation process for separating at least a first component from a multi-component fluid mixture is provided. In one such embodiment, a process is provided, comprising the steps of:
  admitting a multi-component fluid mixture as a feed stream into at least one adsorbent contactor comprising at least one adsorbent material, adsorbing at least a portion of a first component of the feed stream on at least one adsorbent material in the at least one contactor, and recovering a first product stream further comprising at least a second component and at least periodically depleted in the first component relative to the feed stream from the at least one adsorbent contactor;
  admitting a first regeneration stream further comprising at least a third component into the at least one contactor, adsorbing at least a portion of the third component of the first regeneration stream on the at least one adsorbent material in the at least one contactor, desorbing at least a portion of the first component adsorbed on the at least one adsorbent material in the at least one contactor, recovering a second product stream enriched in the first component relative to the feed stream from the at least one contactor, and
  admitting a second regeneration stream in the at least one contactor, desorbing a portion of the third component and a portion of the first component adsorbed on the at least one adsorbent material in the at least one contactor by at least one of temperature swing or partial pressure swing, and recovering a third product stream from the at least one contactor.

In a further embodiment according to the present disclosure, an adsorptive gas separation system is provided for separating at least a first component from a multi-component fluid mixture comprising at least one adsorbent contactor, which further comprises at least one adsorbent material, a first end and a second end, where the first and second ends are axially opposed. In one such embodiment, the adsorptive gas separation system is fluidly connected to admit at least a portion of the multi-component fluid mixture as a feed stream into the first end of at least one contactor, to adsorb at least a portion of the first component on the at least one adsorbent material in at least one contactor and fluidly connected to recover a first product stream from the second end of at least one contactor. The adsorptive gas separation system may also be fluidly connected to admit a first regeneration stream into the second end of at least one contactor to desorb at least a portion of the first component on the at least one adsorbent material, producing a second product stream, and fluidly connected to recover a second product stream from the first end of at least one contactor. The adsorptive gas separation system may also be fluidly connected to admit the multi-component fluid mixture as a second regeneration stream in the first end of the at least one contactor to desorb at least a portion of the first regeneration stream on the at least one adsorbent material and fluidly connected to recover a third product stream from the second end of at least one contactor.

In further embodiments according to the present disclosure, an adsorptive gas separation process for separating at least a portion of a multi-component fluid mixture into one or more components is provided. In one such embodiment, to process is provided, comprising the steps of:

admitting the multi-component fluid mixture as a feed stream into at least one adsorbent contactor; adsorbing at least a portion of a first component of the feed stream on at least one adsorbent material in said at least one adsorbent contactor; recovering a first product stream further comprising at least a second component and depleted in the first component relative to the feed stream from at least one contactor;

admitting a first regeneration stream comprising at least a third component into said at least one contactor; desorbing at least a portion of the first component adsorbed on the at least one adsorbent material in at least one contactor; recovering a second product stream enriched in the first component relative to the feed stream from the at least one contactor, and admitting the second product stream into a condenser, condensing at least a portion of the third component, forming a first stage condensate stream and a first stage purified second product stream, and causing a reduction in pressure in the condenser and the at least one contactor due to said condensing.

In another embodiment according to the present disclosure, an adsorptive gas separation process for separating at least a portion of a multi-component fluid mixture into one or more components is provided. In one such embodiment, the process comprises the steps of:

admitting the multi-component fluid mixture as a feed stream into at least one adsorbent contactor; adsorbing at least a portion of a first component of the feed stream on at least one adsorbent material in said at least one adsorbent contactor; recovering a first product stream further comprising at least a second component and depleted in the first component relative to the feed stream from said at least one contactor;

admitting a first regeneration stream further comprising at least a third component into said at least one contactor; desorbing at least a portion of the first component adsorbed on the at least one adsorbent material in said at least one contactor; recovering a second product stream enriched in the first component relative to the feed stream from said at least one contactor;

admitting a second regeneration stream into said at least one contactor, desorbing at least a portion of the first component and at least a portion of the third component adsorbed on the at least one adsorbent material in said at least one contactor, and recovering a third product stream from said at least one contactor.

In further embodiments according to the present disclosure, an adsorptive gas separation process for separating at least a first component from a multi-component fluid mixture is provided. In one such embodiment, the process comprises the steps of:

admitting the multi-component fluid mixture as a feed stream into at least one adsorbent contactor; adsorbing at least a portion of a first component of the feed stream on at least one adsorbent material in said at least one contactor; recovering a first product stream further comprising at least a second component from said at least one contactor;

admitting at least one first regeneration stream further comprising at least a third component into said at least one contactor; desorbing at least a portion of the first component adsorbed on the at least one adsorbent material in said at least one contactor; recovering a second product stream enriched in the first component relative to the feed stream from said at least one contactor;

where the first regeneration stream has a quantity of heat energy less than a quantity of heat energy consumed for desorbing the first component adsorbed on said at least one adsorbent material in said at least one contactor.

4. BRIEF DESCRIPTION OF THE DRAWINGS

Systems and methods for adsorptive gas separation of at least one fluid component from a multi-component fluid mixture according to various embodiments of the present disclosure will now be described with reference to the accompanying drawing figures, in which.

Like reference numerals refer to corresponding parts throughout the several views of the drawings.

5. DETAILED DESCRIPTION OF THE INVENTION

An adsorptive gas separation process (herein referred to as an "adsorptive process") is provided in accordance with an embodiment of the present disclosure, for adsorptive gas separation of a multi-component fluid mixture or stream comprising at least a first component (which may comprise for example, carbon dioxide, sulfur oxides, nitrogen, oxygen, and/or heavy metals). In one such embodiment, the adsorptive process may desirably separate at least a portion of the first component from the multi-component fluid mixture or stream, which may comprise for example, a combustion gas stream or flue gas stream (herein referred to as "combustion gas stream") produced by a fuel combustor, such as by employing an adsorptive gas separation system (herein referred as "adsorptive system") according to an embodiment of the present disclosure. In one aspect, the adsorptive process may be particularly suitable for gas separation applications where one or more of the following conditions exist: a feed stream is sourced at a low pressure, making a pressure swing adsorption process less desirable; the feed stream comprises a low or dilute concentration of the target component, such as for example, where the target component comprises about 3% of the feed stream; the volume of the feed stream to be separated is large; recovery of a product stream high in purity, for example, about greater than 80% purity, of the target component is desired; low energy and/or steam consumption in the adsorption process is desired; and/or low operating cost is desired. In one aspect, exemplary such gas separation applications may include, for example, post-combustion gas separation of carbon dioxide from a combustion gas stream of a combined cycle power plant.

Typically, a multi-component fluid mixture employed as a feed stream for an adsorptive process may have a plurality of components where each component may have a different affinity for an adsorbent material in an adsorptive system. For example, in an exemplary post-combustion adsorptive gas separation application according to an aspect of the disclosure, a combustion gas stream may comprise at least a first component, for example, carbon dioxide (herein referred to as "$CO_2$") having a weak (relative to other components in the combustion gas stream) affinity for an adsorbent material, a second component, for example, nitrogen (herein referred as "$N_2$") having a very weak (relative to other components in the combustion gas stream) affinity, and optionally a third component, for example, water (herein referred as "$H_2O$") having a strong (relative to other components in the combustion gas stream) affinity for the adsorbent material.

In a particular embodiment according to the present disclosure, an adsorptive system comprises an optional heat exchanger, at least one adsorptive separator, at least a first condenser stage further comprising at least one or a first condenser, for example, a condensing heat exchanger, and optionally at least one fluid pump, for example, an ejector. In one such embodiment, an adsorptive separator may be stationary or moving, and may comprise at least one stationary or moving contactor for supporting at least one adsorbent material. The adsorptive separator may further comprise an enclosure for housing the at least one contactor, and optionally to assist in defining a plurality of stationary or moving zones, for example, an adsorption zone, a first regeneration zone, a second regeneration zone, and an optional conditioning zone, within the enclosure where each zone is substantially fluidly separate and a point on the at least one contactor may cycle through each zone. In one such embodiment, for example, an adsorptive separator comprises at least one moving contactor which may cycle or rotate through a plurality stationary zones, or an adsorptive separator comprises at least one stationary contactor which may have a plurality of moving zones which cycle or rotate around the at least one stationary contactor. In one embodiment, an adsorptive contactor comprises: a plurality of substantially parallel walls which may define a plurality of substantially parallel fluid flow passages, optionally oriented along a longitudinal axis of the contactor, between a first end and a second end which are axially opposed; at least one adsorbent material in and/or on the walls of the contactor, and optionally a plurality of axially continuous electrically and/or thermally conductive filaments oriented substantially along the longitudinal axis of the contactor which may be in direct contact with at least one adsorbent material in and/or on the walls of the contactor. In one aspect, exemplary such adsorbent contactor structures may comprise exemplary parallel passage adsorbent contactor structures as are disclosed in Applicant's U.S. patent application Ser. No. 13/203,714, now granted as U.S. Pat. No. 8,940,072, the contents of which are herein incorporated in their entirety for all purposes. In one aspect, the adsorbent contactor may be stationary or moving within an enclosure. In a particular embodiment, the at least one adsorbent material of a contactor may desirably be dynamically selective for adsorption of a first component over at least one other component of a multi-component fluid mixture, such that a dynamic selectivity is sufficiently high to usably provide adsorptive separation of the fluid mixture by selective adsorption of the first component. Such dynamic selectivity over the cycle of the adsorptive process may comprise at least one of an equilibrium selectivity of at least one adsorbent material for the first component, and a kinetic selectivity of the at least one adsorbent material for the first component.

In a process embodiment according to the present disclosure, an initial step of an adsorptive process or a cooling step for a feed stream may be optionally employed to reduce the temperature of the feed stream prior to admitting the feed stream into an adsorptive separator and at least one contactor. During the initial step or optional cooling step for a feed stream, a feed stream source, for example, a fuel combustor, may optionally produce and admit a multi-component fluid mixture or feed stream into an adsorptive system and an optional heat transfer device, such as for example, a gas-to-gas heat exchanger, a gas-to-liquid heat exchanger or a direct contact cooler (herein referred to as "DCC"), where heat from the feed stream may be transferred to a coolant stream, for example a water stream, admitted into the DCC, reducing the temperature of the feed stream to equal to or less than a first temperature threshold. In one such embodiment, the temperature of the feed stream may be reduced to equal or less than a first temperature threshold of, for example, about 50° C., or in particular about 40° C., or more particularly about 30° C. The feed stream and coolant stream may then be recovered from the DCC.

In one embodiment, during an adsorbing step, the feed stream, may comprise a multi-component gas stream at for example, equal to or less than a first temperature threshold and at a pressure optionally greater than about an ambient pressure. In one such embodiment, ambient pressure may comprise, for example, between about 70-100 kPa absolute (herein referred as "$kPa_{abs}$"), dependent upon factors such as but not limited to the location, elevation, conditions and temperature of the ambient environment at a particular location. In one such embodiment, the feed stream may be admitted into the adsorptive separator, an optional adsorption zone of the adsorptive separator, and at least one contactor or optionally a portion of a contactor within the optional adsorption zone, to enter a first end of the contactor to flow substantially in a direction towards a second end of the contactor. As the feed stream contacts the at least one adsorbent material in a contactor or optionally a portion of a contactor within the optional adsorption zone, at least a portion of a first component of the feed stream, such as for example, $CO_2$ in an exemplary embodiment comprising a combustion gas feed stream may adsorb on the at least one adsorbent material, separating the first component from the remaining non-adsorbed components of the feed stream. In one such embodiment, the adsorption process is exothermic where a heat of adsorption released during adsorption on the adsorbent material may form a thermal wave which moves in a direction substantially the same as the direction of flow of the feed stream in the contactor, such as for example, in a direction from the first end towards the second end of the contactor. The remaining non-adsorbed components of the feed stream, such as for example, the second component or $N_2$ in an exemplary embodiment comprising a combustion gas feed stream, may substantially form a first product stream which may be at least periodically depleted in the first component, for example, $CO_2$, relative to the feed stream. The first product stream may be recovered from the second end of the contactor, optional adsorption zone, adsorptive separator and adsorptive system. In one embodiment, the adsorbing step may be completed and/or terminated when a pre-determined value has been achieved, for example, when a predetermined adsorption time has elapsed, when a predetermined event has been achieved, and/or before or after breakthrough of the first component from a location at or near an end (for example, second end) of a contactor. Upon completion and/or termination of the adsorbing step, in one aspect, a subsequent first regenerating step may follow the adsorbing step.

In a process embodiment according to an aspect of the present disclosure, an optional first product stream recycling step may be employed during the adsorbing step where at least a portion of the first product stream (which may be partially enriched with the first component due to breakthrough of the first component from the contactor) may be recovered, optionally from the second end of the contactor, or optionally from the adsorption zone, and admitted into at least one of an adsorptive separator, an optional adsorption zone, and the first end of at least one contactor as a portion of the feed stream for an adsorption step, which may advantageously increase the recovery of the first component from the feed stream. In one such embodiment, an optional first product stream recycling step may be initiated when, for example, breakthrough of the first component from an end of a contactor has been achieved, prior to breakthrough of the first component from an end of a contactor, when a pre-determined temperature threshold at or near an end of a contactor has been reached, or when a pre-determined elapsed time threshold has been reached. In a further embodiment, the optional first product stream recycling step may be complete and/or terminated, for example, when a predetermined time threshold has been achieved, at or near initiation of a first regenerating step, or when a predetermined concentration of at least one of the first component or second component has been achieved in the first product stream.

In one aspect, a first regenerating step may be employed to at least partially regenerate or desorb at least a portion of the first component adsorbed on the at least one adsorbent material of the contactor or a portion of the contactor within an optional first regeneration zone. In one such aspect, a first regenerating step may be initiated, for example, upon completion of the adsorbing step, termination of the adsorbing step, or before a thermal wave formed during the adsorbing step breaks through an end (which the feed stream flows towards, for example, the second end) of the contactor. Alternatively, a first regenerating step may be initiated, at or before a point where a substantial amount of the first component breaks through an end of the contactor, and/or once one or more pre-determined thresholds have been achieved, such as for example, thresholds in relation to elapsed time, duration, temperature of adsorption have taken reached, and/or when one or more pre-determined threshold concentrations of a selected component or components have been reached.

In a particular process embodiment, a first regenerating step may employ a first regeneration stream desirably low in exergy, such as for example, a steam stream at low pressure, which may advantageously utilize energy and/or a low pressure steam stream which may otherwise be exhausted and/or not utilized in a particular process, or by an integrated adsorptive gas separation system, thereby desirably reducing the consumption of a higher pressure steam stream or steam stream high in exergy. In one aspect, such utilization of a low exergy regeneration stream, may result in reducing an energy penalty or operating cost associated with the adsorptive process. In a particular embodiment, a first regeneration stream may optionally comprise substantially a third component at a temperature of equal to or greater than a second temperature threshold, such as for example, a condensation temperature of the first regeneration stream, or about 100° C. in an embodiment where the first regeneration stream is at a pressure of about 100 $kPa_{abs}$. During the first regenerating step, desorption of at least a portion of a first component adsorbed on the at least one adsorbent material may be driven primarily by at least one of: a temperature swing, for example, a difference in temperature of the at least one adsorbent material during the adsorbing step and first regenerating step, and/or a partial pressure swing, for example, a difference in partial pressure or concentration of at least one component of the first regeneration stream and an equilibrium partial pressure of the at least one component adsorbed on the at least one adsorbent material and/or, a swing in heat of adsorption energy, for example, the difference in heat of adsorption energy of at least one component of the first regeneration stream and the at least one component adsorbed on the at least one adsorbent material, and/or a vacuum swing, for example, a swing in pressure during an adsorbing step and regenerating step, for example, a first regeneration step. In a further embodiment, other secondary mechanisms may be employed to assist in the desorption of at least a portion of a first component from the at least one adsorbent material including, for example, temperature swing, partial pressure swing, vacuum, or displacement purge. Optionally, a first regeneration stream may employ a regeneration medium having a heat of adsorption about the same as the entropy of a phase change for the regeneration medium. In one such embodiment, a phase change condition of a regeneration stream may fall within a temperature swing envelope of an adsorptive process, a first regenerating step may be performed with a first regeneration stream maintaining conditions below a capillary condensation threshold, such as to avoid the formation of acids and/or at elevated temperatures (to manage contaminants of the at least one adsorbent material). In a further embodiment, a first regeneration stream may comprise substantially a condensable fluid stream, and during a first regeneration step a plurality of first regeneration streams may be employed, for example, a (first) first regeneration stream comprising substantially a first component and a (second) first regeneration stream comprising substantially a third component.

In accordance with a particular process embodiment, in a first regenerating step, a first regeneration stream source (such as for example, a low pressure stage or a very low pressure stage of a multistage steam turbine, a very low pressure steam turbine, a heater or a heat exchanger), may admit a first regeneration stream comprising low exergy, for example, water in the form of a steam stream at a pressure equal to or less than about 300 kPa$_{abs}$, or in particular, equal to or less than about 200 kPa$_{abs}$, or more particularly equal to or less than about 100 kPa$_{abs}$, into the adsorptive system, adsorptive separator, an optional first regeneration zone, contactor or a portion of the contactor in the optional first regeneration zone. In such an exemplary first regenerating step, the first regeneration stream may enter the second end of the contactor to flow in a direction substantially towards the first end of the contactor or in a counter-current flow direction to the direction of flow of the feed stream, which may advantageously direct a thermal wave formed during the adsorbing step back towards the first end where the heat of the thermal wave may be utilized during the first regenerating step.

In one such aspect, as the first regeneration stream contacts the at least one adsorbent material, the third component (such as for example, $H_2O$), having a strong affinity for the at least one adsorbent material relative to the first component (such as for example, $CO_2$), may absorb on the at least one adsorbent material, generating a heat of adsorption which may be employed in combination with at least one of: the heat in the first regeneration stream, and the heat of the thermal wave generated during the adsorption of the first component during the adsorbing step; to desorb at least a portion of the first component adsorbed on the at least one adsorbent material on a contactor or a portion of the contactor in the optional first regeneration zone during the first regenerating step. Employing at least a portion of the heat of adsorption, for example, adsorption of the third component or $H_2O$, generated during the first regeneration step may advantageously: reduce the amount of energy, for example, heat energy and/or exergy, required or desired and employed in the first regeneration stream; enable the first regeneration stream to comprise a quantity of heat less than about a quantity of heat consumed for desorbing the at least one component (for example, the first component), adsorbed on the at least one adsorbent material in a contactor and recovered in a second product stream; enable the employment of a first regeneration stream low in exergy; and/or reduce the amount of first regeneration stream admitted during the first regenerating step (which may result in reducing the energy consumption and/or formation of condensation on the at least one adsorbent material). In one aspect, a portion of the first regeneration stream and/or first component, desorbed from the at least one adsorbent material may form a second product stream which may be enriched in the first component relative to the feed stream. The second product stream may be recovered from an end, for example, the first end of the contactor or the first end of a portion of the contactor in the optional first regeneration zone, optional first regeneration zone and adsorptive separator. In a particular such embodiment, a first portion of the second product stream recovered from the contactor may be enriched in the first component relative to the feed stream or optionally comprising substantially the first component, with a low ratio of partial pressure to saturation pressure of the third component (or a large concentration of the first component with a low relative humidity), while a second or subsequent portion of the second product stream recovered from the contactor or a portion of the contactor in the optional first regeneration zone, optional first regeneration zone, and adsorptive separator may be enriched in the third component relative to the feed stream or optionally comprising substantially the third component. Optionally the first portion of the second product stream enriched in the first component or optionally comprising substantially the first component may be employed and admitted as at least a portion of a regeneration stream in a regeneration step, for example, a second regeneration stream in a second regenerating step. In one such aspect, the second portion of the second product stream enriched in the third component or optionally comprising substantially the third component may be admitted into at least one condenser or condensing heat exchanger in a condensing step. Optionally, during the first regenerating step, the contactor may be operable at a pressure of, for example, a sub-ambient pressure of less than about 100 kPa$_{abs}$, but need not be. Alternatively, during a first regenerating step: a first regeneration stream may comprise a condensable fluid, such as for example: a solvent, at a temperature greater than cryogenic temperatures, such as for example, greater than about −180° C.; a plurality of first regeneration streams comprising substantially similar or differing compositions, for example, a fluid stream comprising substantially a third component and a fluid stream enriched in a first component above an adsorption temperature, may be employed, and one or more first regeneration streams may be admitted to enter the first end of the adsorptive separator and/or contactor to flow in a direction substantially towards the second end of the contactor or in a co-current flow direction in relation to the direction of flow of the feed stream in a first regenerating step.

In a particular process embodiment, a condensing step may be employed to condense and separate at least one condensable component from at least a portion of the second product stream and optionally at least a portion of a third product stream recovered from a contactor and adsorptive separator, forming a condensate stream and a purified second product stream which may be higher in purity relative to the second product stream recovered from the adsorptive separator and contactor. Optionally, a pressure drop or a vacuum may be induced during the condensing step, but need not be. In one embodiment, the condensing step is subsequent to the first regeneration step and may occur substantially simultaneously and substantially continuously with a regeneration step, for example, the first regeneration step and/or a second regenerating step. The condensing step may comprise: admitting at least a portion of the second product stream and optionally at least a portion of a third product stream recovered from a contactor and adsorptive separator into a product circuit or a hot circuit of at least a first condenser, such as for example, a first condensing heat exchanger of at least a first condenser stage; admitting a coolant stream recovered from a coolant source into a coolant circuit or a cold circuit of the at least a first condenser (such as for example, first condensing heat exchanger, of the at least a first condenser stage), removing heat from the product circuit or hot circuit of at least a first condenser (for example, a first condensing heat exchanger of at least a first condenser stage) causing at least one component in at least a portion of the second product stream and optionally at least a portion of a third product stream in product circuit or a hot circuit of at least a first condenser (for example, a first condensing heat exchanger of the at least first condenser stage) to condense and separate from the at least a portion of the second product stream and optionally at least a portion of a third product stream, forming a purified second product stream, a condensate stream while optionally inducing a reduced pressure and/or a vacuum, for example, equal or less than about 100 kPa$_{abs}$, or specifically equal or less than about 80 kPa$_{abs}$, or more specifically equal or less than about 50 kPa$_{abs}$, or most specifically, equal or less than about 20 kPa$_{abs}$ in at least the hot circuit of at least a first condenser (for example, a first condensing heat exchanger) and optionally at least a portion of the adsorptive separator and at least a portion of a contactor; recovering the coolant stream from the coolant circuit or a cold circuit of the at least a first condenser (for example, first condensing heat exchanger, of the at least first condenser stage); the coolant stream in coolant circuit or a cold circuit of the at least a first condenser (for example, first condensing heat exchanger, of the at least a first condenser stage); recovering a purified second product stream and a condensate stream from the product circuit or hot circuit of at least a first condenser (for example, a first condensing heat exchanger of at least a first condenser stage).

In a particular process embodiment during a condensing step, at least a first condenser stage, comprising at least a first condenser, for example, a first condensing heat exchanger, having a cooling circuit or cold circuit and a product circuit or hot circuit which are fluidly separate, may be employed. In a condensing step, at least a portion of the second product stream and optionally at least a portion of a third product stream, for example, at least a portion of a third product stream which may be enriched in the third component, recovered from at least one contactor, optional first regeneration zone of the adsorptive separator, optional second regeneration zone of the adsorptive separator, adsorptive separator and may be admitted into a product or hot circuit of at least a first condensing heat exchanger of the at least first condensing stage. A coolant stream may be recovered from a condenser coolant source, admitted into the cooling or cold circuit of at least a first condensing heat exchanger of the at least first condensing stage to transfer and remove heat from the product circuit of the at least a first condensing heat exchanger of the at least first condensing stage, which may cause condensable components, for example, third component, in at least a portion of the second product stream and optional at least a portion of a third product stream in the product circuit to condense and separate, forming a condensate stream and a purified second product stream comprising the first component while optionally inducing a pressure drop and/or a vacuum, for example, equal or less than about 100 $kPa_{abs}$, or particularly equal or less than about 80 $kPa_{abs}$, or more particularly equal or less than about 50 $kPa_{abs}$, or even more particularly, equal or less than about 20 $kPa_{abs}$, within the product circuit and fluidly connected passages, including for example, fluidly connected portions of the adsorptive separator, optional first regeneration zone of the adsorptive separator, optional second regeneration zone of the adsorptive separator, fluidly connected portions of the contactor, and passages upstream to the adsorptive separator. The coolant stream may be recovered from the cooling circuit of the at least a first condensing stage and at least a first condensing heat exchanger. The condensate stream may be recovered from the product or hot circuit of the at least first condensing heat exchanger and at least first condensing stage, optionally with a pump. After at least partial condensation of, or separation of the condensable component from the at least a portion of second product stream and optional at least a portion of third product stream in the product circuit, the purified second product stream may form, and may be recovered from the product circuit of the at least first condensing heat exchanger and at least first condensing stage. Optionally at least one pump including, for example, an ejector, a vacuum pump, or a single stage or multistage compressor operating optionally at sub-ambient inlet pressure, and/or at least one valve, for example, a check valve or a throttling valve, may be fluidly connected downstream to the product circuit of a condenser or condensing heat exchanger and/or a condensing stage to optionally assist in at least one of recovering the purified second product stream from, maintaining a reduced pressure or vacuum in, and/or further reducing the pressure in, a condenser or condensing heat exchanger and/or a condensing stage. A purified second product stream recovered from the at least first condensing heat exchanger and/or at least first condensing stage, or pump, may be directed and admitted into an end use of the purified second product stream, optionally via a compressor to increase the pressure of the purified second product stream to form a compressed second product stream.

In one aspect, maintaining a reduction in pressure or vacuum in the product circuit of the at least first condensing heat exchanger and at least first condensing stage and fluidly connected portions of the adsorptive separator, optional first regeneration zone, optional second regeneration zone, and at least a portion of a contactor may advantageously enable a vacuum desorption mechanism or vacuum assisted desorption of one or more components from the at least one adsorbent material of the contactor or the at least one adsorbent material of a portion of a contactor in an optional first regeneration zone and/or optional second regeneration zone, during a first regenerating step and/or optionally a second regenerating step. Furthermore, in a particular embodiment, the reduction in pressure or vacuum within the contactor may also advantageously reduce the quantity of first regeneration stream or third component desired or required for the first regenerating step, formation of condensation, and/or adsorption of a condensable component in a condensed form, for example, third component or $H_2O$ on the at least one adsorbent material, which may further result in reducing the energy consumed for desorption of the adsorbed components or regeneration of the at least one adsorbent material and operating costs. In an alternative embodiment, employing at least a first condenser stage comprising at least a first condensing heat exchanger and optionally at least one ejector, may advantageously induce a pressure reduction or a vacuum without employing a mechanically actuated vacuum pump, for example, an electric powered vacuum pump, which may result in reducing the energy consumption and operating cost during at least a first regenerating step and adsorptive gas separation process. In a further aspect, when the above described vacuum desorption mechanism is employed to assist in regeneration of the at least one adsorbent material, for example, during a first regenerating step, a first regeneration stream may be admitted into a contactor at a suitably reduced pressure to facilitate vacuum assisted desorption of the first component from the adsorbent material. Such pressure reduction of the first regeneration stream may optionally be achieved by throttling, for example, over a valve, or by mechanical expansion to provide some energy recovery.

In a process embodiment according to the present disclosure, heat of compression from an aftercooler or intercooler downstream of a vacuum pump or a compressor, or between compressor stages of a multistage compressor, may be recovered and employed for the adsorptive gas separation process, such as for example, to generate a low pressure steam stream. In one such embodiment, a low pressure steam stream may be generated at a pressure equal to or less than about 300 $kPa_{abs}$, or particularly, equal to or less than about 200 $kPa_{abs}$, or more particularly equal to or less than about 100 $kPa_{abs}$, which may form at least a portion of the first regeneration stream and/or to replenish steam recovered from the low exergy regeneration stream source, first regeneration stream source or a steam turbine, or to increase the temperature of a fluid stream comprising substantially a third component to a suitable temperature for employment as a first and/or a second regeneration stream. In another aspect, further or additional condensation of third component from a purified second product stream may be achieved by employing additional condenser or condensing heat exchanger stages, and/or between at least the lower pressure stages of a multistage compressor employed for compression of a purified second product stream recovered from the condensing heat exchanger.

In an alternative process embodiment, during a condensing step, a plurality of condenser stages, comprising at least one condenser or at least one condensing heat exchanger, fluidly connected in series may be employed. A condenser stage may optionally have a pump, including, for example, an ejector, a vacuum pump, or a single stage or multistage compressor operating optionally at sub-ambient inlet pressure, and/or at least one valve, for example, a check valve or a throttling valve fluidly connected downstream to a condenser or condensing heat exchanger and/or between each condenser stage.

In a further process embodiment according to the present disclosure, during a condensing step, at least a first ejector may be employed to assist in at least one of recovering the purified second product stream from a condenser, maintaining a reduced pressure or vacuum in a condenser, and/or further reducing the pressure in a condenser and may be fluidly connected downstream of a condenser or a condensing heat exchanger and fluidly connected to a purified second product stream source, for example, a compressor, which may supply the purified second product stream at an elevated pressure. In one aspect, a purified second product stream may be recovered from a condenser or a condensing heat exchanger and admitted into a low pressure port of an ejector. In a further aspect, a purified second product stream at elevated pressure, for example, greater than about 150 $kPa_{abs}$, or particularly greater than about 200 $kPa_{abs}$, or more particularly greater than about 600 $kPa_{abs}$, (herein referred as "compressed second product stream") may optionally be recovered from a compressor or one or more lower pressure stages of a multistage compressor and admitted as a motive stream into a high pressure port of the ejector, which may desirably assist in recovering the purified second product stream from the condenser, further reduce the pressure and/or maintain the reduced pressure or vacuum in the fluidly connected condenser or condensing heat exchanger, adsorptive separator, contactor and components upstream to the adsorptive separator. In one such aspect, the purified second product stream admitted into the low pressure port and the compressed second product stream admitted into the high pressure port of the ejector may combine within the ejector, which may then be recovered as a combined second product stream from the ejector. The combined second product stream may be admitted optionally into at least one ejector fluidly connected in series to further reduce pressure and/or maintain the vacuum upstream of the ejector, or admitted into a compressor or multistage compressor to increase the pressure of the combined second product stream, forming a compressed second product stream prior to directing and admitting to an end use or end user of the compressed purified second product stream. Optionally, a combined second product stream may be admitted into at least a second condenser stage or a second stage condensing heat exchanger, further causing condensable components, for example, the third component, in the combined second product stream to condense, forming a condensate stream and a purified second product stream which may be higher in purity relative to the purified second product stream recovered from the first stage. In another aspect, a purified second product stream may be recovered from the second condenser stage or second stage condensing heat exchanger and admitted into optionally, one or more pumps or ejectors, a compressor, or a multi-stage compressor, while the condensate stream may be recovered from the second condenser stage or second stage condensing heat exchanger. Optionally, additional condensers stages, condensers, condensing heat exchangers, ejectors or pumps may be employed to further separate condensable components from the purified second product stream, reduce pressure and/or maintain the reduced pressure or vacuum in the fluidly connected passages and/or components.

In a further process embodiment according to the present disclosure, an optional pre-regenerating step may be optionally employed to increase the quantity of the first component adsorbed on the at least one adsorbent material subsequent to an adsorbing step and prior to a first regenerating step, which may result in increasing the concentration or purity of the second product stream recovered from the contactor during the first regenerating step. During a pre-regenerating step, a pre-regeneration stream may be employed optionally comprising at least a portion of a first regeneration stream, or a fluid stream comprising substantially the third component, and may optionally be recovered from a first regeneration stream source and admitted into the adsorptive system, adsorptive separator, and at least one contactor, to optionally enter the second end of the contactor to flow in a direction substantially towards the first end of the contactor or in a counter-current flow direction to the direction of flow of the feed stream. In one aspect, a pre-regeneration stream may desorb at least a portion of the second component or other diluent fluid components which may be undesirably co-adsorbed on the at least one adsorbent material, forming a heavy reflux stream which may comprise a larger concentration of the second component relative to other components in the heavy reflux stream and may be enriched in the first component relative to the feed stream. The heavy reflux stream may be recovered optionally from the first end of the contactor, recycled and admitted into the contactor prior to an adsorbing step or after an adsorbing step.

In a particular process embodiment, a second regenerating step subsequent to a first regenerating step, may be employed to at least partially regenerate the at least one adsorbent material of the contactor, for example, to desorb at least partially the first component and/or at least partially the third component adsorbed on the at least one adsorbent material. During a second regenerating step, desorption of a component adsorbed on the at least one adsorbent material may be driven primarily by a swing in temperature and/or swing in partial pressure or concentration of at least one component. A second regeneration stream may, optionally comprise, at least one component having a partial pressure less than an equilibrium partial pressure of the at least one component adsorbent on the at least one adsorbent material in a contactor, and/or a fluid stream enriched in the second component relative to the feed stream, for example, a concentration greater than about 50% of a second component, According to one aspect, a second regeneration stream may be at a temperature of equal to or greater than a third temperature threshold, such as for example, about a condensation temperature of the second regeneration stream, and optionally below a temperature of the at least one adsorbent material during the first regenerating step. In one such aspect, suitable fluid streams for employment as a second regeneration stream may include, for example, a combustion gas stream produced and recovered from a fuel combustor or an air stream at elevated temperatures, and/or a portion of a second product stream, for example, a first portion of a second product stream enriched in the first component with a low partial pressure of the third component or low humidity.

In a particular process embodiment, in a second regenerating step, a second regeneration stream source, for example, a fuel combustor, may admit a second regeneration stream into the adsorptive system, adsorptive separator, optional second regeneration zone, and contactor or a portion of the contactor in the optional second regeneration zone to enter the first end of the contactor to flow in a direction substantially towards the second end of the contactor, or in a co-current flow direction in relation to the direction of flow of the feed stream. As the second regeneration stream flows in the contactor and contacts the at least one adsorbent material, a swing in temperature and/or a difference in partial pressure or concentration between the second regeneration stream and an equilibrium partial pressure of the adsorbed components, such as for example, the third component and first component, may desirably cause at least a portion of the adsorbed components to desorb from the at least one adsorbent material. In one such aspect, a portion of the second regeneration stream and/or desorbed components may form a third product stream which may be enriched in the first component and/or third component relative to the feed stream. The third product stream may be recovered from at least one of: the second end of the contactor, an optional second regeneration zone, the adsorptive separator and adsorptive system. In one such example, a first portion of the third product stream recovered from the contactor may be enriched in the third component, or may for example, comprise substantially the third component or a larger concentration of the third component relative to the concentration of at least one of the first and/or second component, while a second or subsequent portion of the third product stream recovered from the contactor may be enriched in the first component, may, for example, comprise substantially at least one of the first component and/or second component or a larger concentration of at least one of the first component and/or second component relative to the concentration of the third component. In one such embodiment, employing a first regeneration stream during a first regeneration step and a second regeneration stream during a second regenerating step comprising different regeneration mediums and streams, may advantageously reduce the consumption of at least one of the first or second regeneration mediums and streams for regeneration of the at least one adsorbent material or adsorptive process. In one such aspect, for example, employing a first regeneration stream during a first regeneration step and a second regeneration stream during a second regeneration step may desirably reduce the quantity of steam consumed for regeneration of the at least one adsorbent material relative to a process which may employ only one regeneration step employing steam as a regeneration medium. In an exemplary such embodiment, the second regenerating step may also reduce the temperature of the at least one adsorbent material and contactor to a temperature, for example, less than a temperature during the first regenerating step, due to desorption of the third component and/or first component adsorbed on the at least one adsorbent material while reducing the formation of condensation which may advantageously assists in the regeneration process while reducing the energy consumption and operating cost of the adsorptive gas separation process. Optionally, during the second regenerating step, the contactor and/or at least one adsorbent material may be maintained at a sub-ambient pressure, for example, of less than about 100 kPa$_{abs}$ (or for example, between about 70-100 kPa$_{abs}$, dependent upon factors such as but not limited to the location, elevation, conditions and temperature of the ambient environment at a particular location), and the third product stream may be recovered from the contactor or second end of the contactor, and admitted to combine as a portion of a feed stream such as for admitting into a DCC prior to admitting into the contactor, or into the contactor. In one such embodiment, such sub-ambient pressure during the second regenerating step may advantageously increase the efficiency of the adsorptive process, recovery of the component desired for separation, for example, first component, and/or purity of the second product stream.

In an alternative process embodiment according to the present disclosure, during a second regenerating step a second regeneration stream may comprise a fluid stream enriched in the first component relative to the feed stream. Optionally, the second regeneration stream may be provided at a temperature of equal to or greater than an exemplary third temperature threshold, or may be provided at a temperature of equal to or greater than a fourth temperature threshold (for example, about the upper temperature of the at least one adsorbent material during the first regenerating step or during desorbing at least a portion of said first component adsorbed on said at least one adsorbent material). In a further optional embodiment, the second regeneration stream may optionally be provided comprising at least one component (for example, the third component) having a partial pressure less than an equilibrium partial pressure of the at least one component (for example, the third component), adsorbed on the at least one adsorbent material in a contactor. In one such embodiment, a suitable second regeneration stream may include, for example, a portion (for example, a first portion and/or first period) of a second product stream (enriched with the first component relative to the feed stream or comprising substantially the first component, with a low partial pressure of a third component or a low relative humidity) recovered from a contactor and optional first regeneration zone during a first regenerating step, at least a portion of a purified second product stream (which may be recovered downstream from at least one condenser or condensing heat exchanger, having at least a portion of the third component separated and removed from the second product stream), and/or at least a portion of a compressed second product stream recovered from a compressor interstage or downstream of a compressor for compressing the purified second product stream. In a particular such embodiment, the temperature of a second regeneration stream including, for example, a second product stream or a purified second product stream, may be increased to a suitable temperature for employment as a second regeneration stream by admitting and recovering the second regeneration stream through an auxiliary heat exchanger or an auxiliary heater. An auxiliary heat exchanger may receive heat energy from, for example, a heat recovery steam generator, a combustion gas stream produced by a fuel combustor, a feed stream for an adsorptive system, a coolant stream or interstage coolant stream for a compressor for compressing a second product stream or a process stream from an adsorptive system. An auxiliary heater may be, for example, a gas-fired heater or an electric heater. Optionally, during the second regenerating step, the contactor and/or the at least one adsorbent material may be maintained at, for example, sub-ambient pressure, or less than about 100 kPa$_{abs}$ (or for example, between about 70-100 kPa$_{abs}$, dependent upon factors such as but not limited to the location, elevation, conditions and temperature of the ambient environment at a particular location), the second regeneration stream may be admitted into the adsorptive separator and contactor to enter the second end of the contactor to flow in a direction substantially towards the first end of the contactor (or in a counter-current flow direction in relation to the direction of flow of the feed stream), and/or at least a portion of the third product stream recovered from the contactor may admitted into at least one condenser or condensing heat exchanger. When a first portion and/or first period of a second product stream recovered from a contactor (during the first regenerating step) is employed as at least a portion of a second regeneration stream during a second regenerating step, a second and/or subsequent portion of the second product stream may be recovered from the contactor (during the first regenerating step) and admitted into at least one condenser or condensing heat exchanger as described in the first regenerating and condensing steps above.

In an alternative process embodiment according to the present disclosure, a second regenerating step subsequent to a first regenerating step, may be employed to at least partially regenerate the at least one adsorbent material of the contactor. In one such embodiment, during a second regenerating step, desorption of the components adsorbed on the at least one adsorbent material may be driven primarily by a swing or difference in partial pressure and/or a swing in humidity, of at least one component. During a second regenerating step, a second regeneration stream, for example, a combustion gas stream, an air stream, an inert gas stream, a fluid stream enriched in the first component relative to the feed stream, a fluid stream comprising a large concentration or substantially the first component, a first product stream from an adsorptive separator, or a fourth product stream from an adsorptive separator, may be employed where the partial pressure including, for example, relative humidity, of the at least one component in the second regeneration stream may be actively or passively controlled, and maintained below a partial pressure to saturation pressure threshold of the at least one component in the second regeneration stream, or a relative humidity threshold of the second regeneration stream. In a particular such embodiment, for example, the partial pressure of the at least one component in the second regeneration stream may be maintained below a relative humidity threshold of less than about 100%, or in particular less than about 50%, or more particularly, less than about 10%. In one such embodiment, the temperature of the second regeneration stream may be actively or passively controlled, to provide a temperature, for example, greater than the third temperature threshold and optionally less than a temperature of the at least one adsorbent material during the first regenerating step. In an exemplary such embodiment, employing a second regeneration stream during a second regenerating step having a partial pressure to saturation pressure or relative humidity of less than 100% may advantageously reduce the formation of condensable components within the contactor and/or adsorbed on the at least one adsorbent material.

In a further alternative process embodiment according to the present disclosure, an adsorptive system may employ a gas-to-gas heat exchanger for a cooling step for a feed stream described above, where a feed stream source, for example, a fuel combustor, may admit a multi-component fluid mixture or feed stream into an adsorptive system and gas-to-gas heat exchanger to supply, transfer heat to, and increase the temperature of the gas-to-gas heat exchanger and the second regeneration stream while decreasing the temperature of the feed stream, prior to admitting the feed stream into the contactor. In one such embodiment, during a second regenerating step, a second regeneration stream source, for example, an air blower, may admit a second regeneration stream for example, a combustion gas stream, an air stream, an inert gas stream, or a first product stream from an adsorptive separator, into the adsorptive system, and into a gas-to-gas heat exchanger to increase the temperature of the second regeneration stream. The second regeneration stream may be recovered from the gas-to gas heat exchanger and admitted into the adsorptive separator and contactor to enter the first end of the contactor to flow in a direction substantially towards the second end of the contactor, or in a co-current flow direction in relation to the direction of flow of the feed stream. As the second regeneration stream flows in the contactor the second regeneration stream may cause a swing in humidity, while displacing and purging adsorbed components, for example, first component and third component, from the at least one adsorbent material. In one such aspect, a portion of the second regeneration stream and/or desorbed components for example, third component and H$_2$O, may form a third product stream which may be enriched in the third component relative to the feed stream. The third product stream may be recovered from the second end of the contactor, adsorptive separator and adsorptive system. Optionally, the third product stream may be admitted into a combustor as a portion of the oxidant stream for the combustor. The second regenerating step and second regeneration stream may decrease the temperature of the at least one adsorbent material and contactor to a temperature less than a temperature during the first regenerating step, which may advantageously assist in regeneration of the at least one adsorbent material which may also advantageously reduce the energy consumption and operating cost of the adsorptive process. Optionally, the third product stream may be recovered from the contactor or second end of the contactor, and admitted to combine as a portion of a feed stream for admitting into the gas-to-gas heat exchanger prior to admitting into the contactor, or directly into the contactor, which in one embodiment may advantageously increase the efficiency of the adsorptive process, recovery of the component desired for separation, for example, first component, and/or purity of the second product stream. Alternatively, the second regeneration stream may be recovered from the gas-to-gas heat exchanger and admitted into an adsorptive separator and contactor to enter the second end of the contactor to flow in a direction substantially towards the first end of the contactor, or in a counter-current flow direction in relation to the direction of flow of the feed stream, and the third product stream may be recovered from the first end of the contactor, adsorptive separator and adsorptive system.

In a particular embodiment, a conditioning step subsequent to a second regenerating step, may be optionally employed to partially regenerate the at least one adsorbent material, sweep components from the contactor, and/or to change the temperature of the at least one adsorbent material and contactor in preparation for a subsequent adsorbing step. During a conditioning step, a conditioning stream comprising a component having a weaker affinity (for example, a second component or N$_2$) for the at least one adsorbent material relative to the selectively adsorbed component (for example, a first component or CO$_2$) may be employed. In one such embodiment comprising a conditioning step, a conditioning stream comprising substantially a third component, for example, an air stream, at a temperature equal to or less than the first temperature threshold (for example, about 50° C., or in particular about 40° C., or more particularly about 30° C.), may be employed.

In another embodiment comprising a conditioning step, a conditioning source may admit a conditioning stream into the adsorptive system, adsorptive separator, optional conditioning zone and contactor or a portion of the contactor in optional conditioning zone, to enter the first end of the contactor to flow substantially in a direction towards the second end of the contactor, or in a co-current flow direction in relation to the direction of flow of the feed stream. As the conditioning stream flows in the contactor, the conditioning stream may purge residual components and moisture from the at least one adsorbent material and contactor, while reducing the temperature of the at least one adsorbent material and contactor to a temperature optionally equal to or less than the first temperature threshold. The conditioning stream and components purged from the at least one adsorbent material may form a fourth product stream which may be recovered from the second end of the contactor, adsorptive separator and adsorptive system. Alternatively, a fourth product stream may be recovered from the second end of the contactor, optional conditioning zone, adsorptive separator, adsorptive system and admitted into a fuel combustor as at least a portion of an oxidant stream for combustion and production of a combustion gas stream.

In a further embodiment according to the present disclosure, an adsorptive process comprises an optional cooling step for a feed stream, an adsorbing step, optional pre-regenerating step, a first regenerating step, a second regenerating step and an optional conditioning step. In one such embodiment, the adsorbing step, optional pre-regenerating step, first regenerating step, second regenerating step and optional conditioning step may be cycled sequentially and repeated substantially continuously or intermittently. The optional cooling step, adsorbing step, optional pre-regenerating step, first regenerating step, second regenerating step and optional conditioning step may occur substantially simultaneously in an adsorptive system, for example, in an adsorptive system employing five or more adsorptive separators and contactors, or a adsorptive system employing a single adsorptive separator having a single contactor which moves or cycles through at least five zones within the adsorptive separator.

In a further alternative process embodiment according to the present disclosure, an adsorptive process may further comprise at least one optional depressurization step and at least one pressurization step where at least one optional depressurization step may occur subsequent to an adsorbing step and prior to a first regenerating step, and at least one optional pressurization step may occur subsequent to first regenerating step and prior to optional conditioning step or adsorbing step. In one such embodiment, the optional depressurizing step comprises: fluidly connecting an optional depressurization zone with at least one optional pressurization zone; forming a pressure equalization stream; recovering a pressure equalization stream from the optional depressurization zone, and reducing a pressure in optional depressurization zone. Prior to the end of an adsorbing step or the start of optional depressurizing step, the optional depressurization zone may be substantially sealed to reduce the leakage of gasses into the optional depressurization zone. At the start of optional depressurizing step a pressure of the optional depressurization zone may be greater than a pressure of the optional pressurization zone. As the optional depressurization zone is fluidly connected with the optional pressurization zone, at least a portion of the first component adsorbed on the at least one adsorbent material in the contactor within optional depressurization zone may desorb, forming the pressure equalization stream which may be enriched in the first component relative to the feed stream. In one such embodiment, the optional pressurizing step comprises: fluidly connecting at least one optional pressurization zone with an optional depressurization zone; admitting at least a portion of a pressure equalization stream into at least one optional pressurization zone, and increasing a pressure of at least one optional pressurization zone. As at least a portion of a pressure equalization stream is admitted into at least one optional pressurization zone, at least a portion of the first component in the pressure equalization stream may adsorb on the at least one adsorbent material in the contactor.

Figure 1:
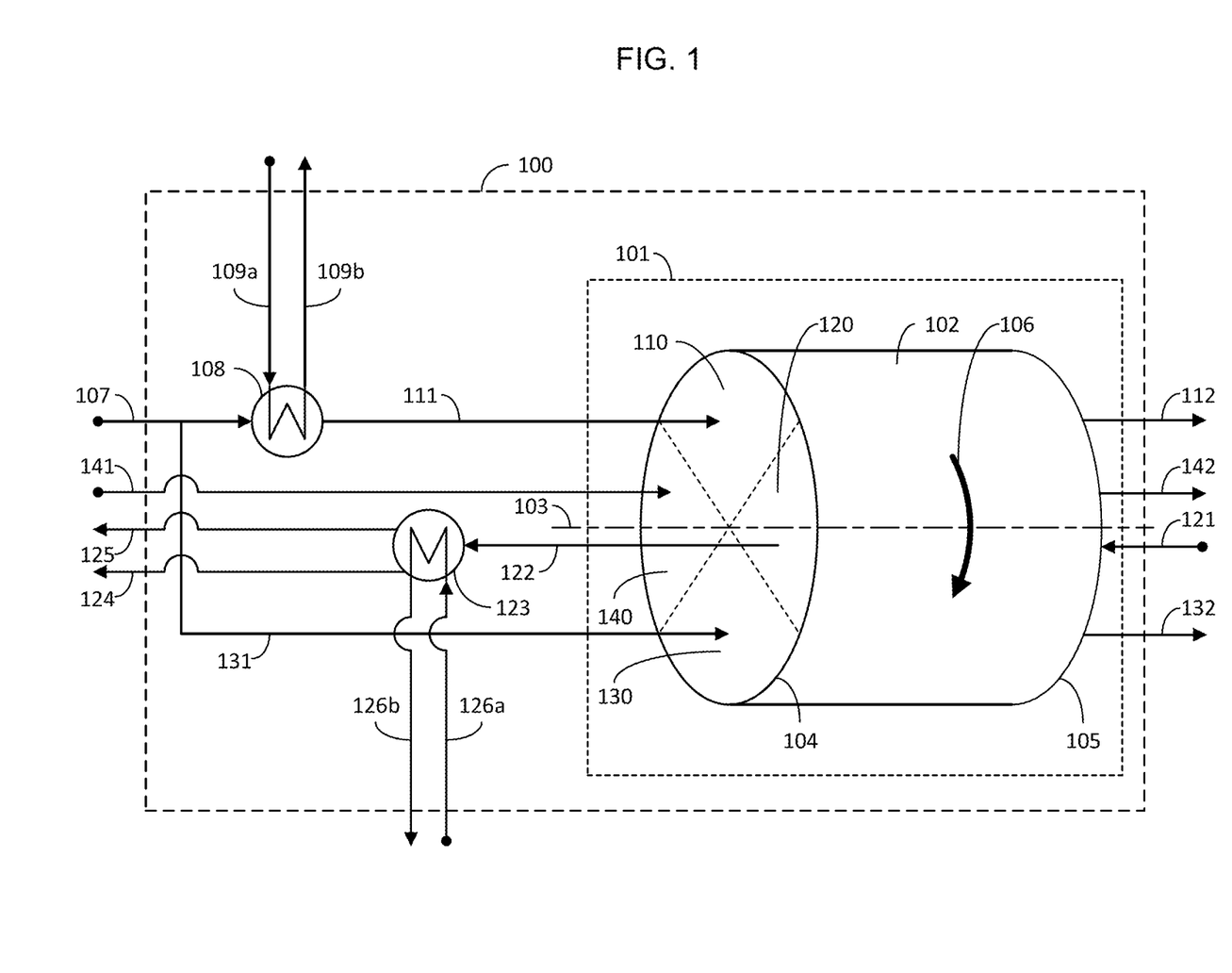
FIG. 1 is a simplified schematic diagram illustrating an adsorptive gas separation system or an adsorptive separation system according to an embodiment of the present disclosure comprising an optional direct contact cooler, an adsorptive gas separator or adsorptive separator and a condensing heat exchanger. The adsorptive gas separator is fluidly connected to receive a portion of the feed stream for the adsorptive separation system, as at least one of a feed stream and as a regeneration stream.

FIG. 1 is a simplified schematic diagram illustrating an exemplary embodiment adsorptive gas separation system or adsorptive system 100 comprising an optional heat exchanger or direct contact cooler 108, an adsorptive gas separator or adsorptive separator 101, comprising a moving contactor 102, and a condenser or specifically a condensing heat exchanger 123. The exemplary adsorptive gas separator 100 is configured having a single contactor 102 cycling or rotating around an axis through four stationary zones, for example, an adsorption zone 110, a first regeneration zone 120, a second regeneration zone 130, and a conditioning zone 140, suitable for application according to an exemplary embodiment of the adsorptive processes described above. The adsorptive gas separator 101 is fluidly connected to receive at least a portion of the feed stream for the adsorptive separation system, as a feed stream and a regeneration stream. In an exemplary application, the embodiment adsorptive gas separation system may be employed for adsorptive gas separation of at least a first component (such as, for example, carbon dioxide, sulfur oxides, nitrogen, oxygen, and/or heavy metals), from a multi-component fluid mixture or stream, for example, a flue gas stream or a combustion gas stream produced by a fuel combustor. In one embodiment, the combustion gas stream also comprises, a second component, for example, nitrogen or $N_2$, and a third component, for example, water or $H_2O$, but need not.

In a system embodiment according to the present disclosure, an exemplary adsorptive gas separation system or an adsorptive system 100 comprises an optional heat transfer device, for example, a direct contact cooler or DCC 108, a condensing heat exchanger 123, and an exemplary adsorptive gas separator or adsorptive separator 101, comprising an enclosure (not shown in FIG. 1) and a contactor 102. The enclosure (not shown in FIG. 1) may assist in defining a plurality of stationary zones (shown between dashed lines in FIG. 1), for example, an adsorption zone 110, a first regeneration zone 120, a second regeneration zone 130, and a conditioning zone 140, where the zones are substantially fluidly separate to each other within the enclosure (not shown in FIG. 1) and contactor 102. In one such embodiment, contactor 102 may comprise: a plurality of substantially parallel walls which may define a plurality of substantially parallel fluid flow passages (not shown in FIG. 1) oriented in an axial direction parallel to a longitudinal axis or first axis 103, between a first end 104 and a second end 105 which are axially opposed; at least one adsorbent material (not shown in FIG. 1) in and/or on the walls of contactor 102; optionally a plurality of continuous electrically and/or thermally conductive filaments (not shown in FIG. 1) oriented substantially parallel to first axis 103, which are optionally in direct contact with at least one adsorbent material (not shown in FIG. 1) in or on the walls (not shown in FIG. 1) of contactor 102. Contactor 102 may be powered by any suitable device (not shown in FIG. 1), for example, an electric motor (not shown in FIG. 1), which cycles or rotates contactor 102 around first axis 103, in a direction shown by an arrow 106, substantially continuously or intermittently and through stationary zones, for example, adsorption zone 110, first regeneration zone 120, second regeneration zone 130, and conditioning zone 140.

In an exemplary systems embodiment, a multi-component fluid stream source or feed source, for example, a combustor (not shown in FIG. 1) may be fluidly connected to admit a multi-component fluid mixture, for example, a combustion gas stream, as a feed stream 107, into adsorptive system 100, an optional heat transfer device, for example, a direct contact cooler or a DCC 108, adsorptive separator 101, second regeneration zone 130 and a portion of contactor 120 within second regeneration zone 120. In one aspect, a coolant source (not shown in FIG. 1) may be fluidly connected to admit a coolant stream 109a into DCC 108 and optionally to recover a coolant stream 109b from DCC 108. At least a portion of feed stream 107 may be admitted in DCC 108, to reduce the temperature of feed stream 107, such as to equal to or less than a first temperature threshold, for example, about 50° C., or particularly about 40° C., or more particularly about 30° C., forming a feed stream 111. Alternatively, DCC 108 may comprise any suitable heat exchange device including, for example, a gas-to-gas heat exchanger, or a gas-to-liquid heat exchanger.

In one embodiment, DCC 108 may be fluidly connected to admit feed stream 111 into adsorptive separator 101, adsorption zone 110 and a portion of contactor 102 within adsorption zone 110, to flow in a direction substantially from first end 104 to second end 105 of contactor 102. As feed stream 111 contacts the at least one adsorbent material (not shown in FIG. 1) within adsorption zone 110, at least a portion of a first component, for example, $CO_2$, may be adsorbed on the at least one adsorbent material (not shown in FIG. 1), separating the first component from feed stream 111. The non-adsorbed components, for example, second component or $N_2$, may form a first product stream 112, which may desirably be depleted in the first component relative to feed stream 111, and may be recovered from second end 105 of a portion of contactor 102 within adsorption zone 110, adsorption zone 110, adsorptive separator 101, and adsorptive system 100. Adsorption zone 110, adsorptive separator 101, and adsorptive system 100 may be fluidly connected to direct at least a portion of first product stream 112 to, for example, a stack for dispersion and release into the atmosphere, to another gas separation process, or to an industrial process (all not shown in FIG. 1). Second end 105 of a portion of contactor 102 within adsorption zone 110 (and part of adsorptive separator 101), may optionally be fluidly connected to periodically recover and admit at least a portion of first product stream 112, for example, a portion of first product stream 112 enriched in the first component as a result of breakthrough of the first component, into first end 104 of a portion of contactor 102 within adsorption zone 110 and adsorptive separator 101, for example, by periodically admitting and combining at least a portion of first product stream 112 with feed stream 111 or feed stream 107. In one such embodiment, periodic recycling of at least a portion of first product stream 112 into adsorption zone 110 may advantageously increase the recovery of the first component from feed stream 111.

In a further system embodiment according an aspect to the present disclosure, a first regeneration stream source or a low exergy source, for example, a low pressure stage or a very low pressure stage of a multistage steam turbine, a very low pressure steam turbine, a low pressure boiler or very low pressure boiler (all not shown in FIG. 1), may be fluidly connected to admit a first regeneration stream 121, comprising, for example, a steam stream low in exergy, at a temperature equal to or greater than about a condensation temperature of first regeneration stream 121, into adsorptive system 100, adsorptive separator 101, first regeneration zone 120, and a portion of contactor 102 within first regeneration zone 120, to flow in a direction substantially from second end 105 to first end 104 of contactor 102, or in a substantially counter-current flow direction in relation to the direction of flow of feed stream 111. As first regeneration 121 contacts the at least one adsorbent material (not shown in FIG. 1) within first regeneration zone 120, of adsorptive separator 101, a component, for example, the third component or $H_2O$, may absorb on the at least one adsorbent material (not shown in FIG. 1), generating a heat of adsorption which along with the heat energy in first regeneration stream 121 may assist in desorbing at least a portion of at least the first component adsorbed on the at least one adsorbent material (not shown in FIG. 1) in contactor 102 within first regeneration zone 120 and adsorptive separator 101. A portion of first regeneration stream 121 and/or desorbed components, for example, first component, may form a second product stream 122 which may be enriched in the first component relative to the feed stream 111 and may be recovered from first end 104 of a portion of contactor 102 within first regeneration zone 120, first regeneration zone 120 and adsorptive separator 101. Optionally, a first portion of second product stream 122 recovered from first end 104 of a portion of contactor 102 within first regeneration zone 120 and first regeneration zone 120 may be enriched with the first component relative to feed stream 111 and have a low partial pressure of the third component or a low relative humidity, while a second or subsequent portion of the second product stream 121 recovered from first end 104 of a portion of contactor 102 within first regeneration zone 120 and first regeneration zone 120 may be enriched in at least one component of the first regeneration stream, for example, third component, relative to feed stream 111. Optionally, adsorptive separator 101 may be fluidly connected to optionally at least periodically recover a first portion of second product stream 122 from first regeneration zone 120, for example, from a first end 104 of a portion of contactor 102 within first regeneration zone 120 and optionally adsorptive separator 101, and admit the first of portion of second product stream 122 into optionally adsorptive separator 101 and second regeneration zone 130, for example, into a second end 105 of a portion of contactor 102 within second regeneration zone 130, as at least a portion of a second regeneration stream (not shown in FIG. 1) in a second regeneration step. The second portion of second product stream 122 may be recovered from first regeneration zone 120, for example, from a first end 104 of a portion of contactor 102 within first regeneration zone 120, and adsorptive separator 101 before admitting into a product circuit (not shown in FIG. 1) of condensing heat exchanger 123.

In another system embodiment according to an aspect of the present disclosure, a condenser coolant source (not shown in FIG. 1) may be fluidly connected to admit a coolant stream 126a into a cooling circuit or a cold circuit (both not shown in FIG. 1) of condensing heat exchanger 123 and optionally recover a coolant stream 126b from the cooling circuit (not shown in FIG. 1) of condensing heat exchanger 123, to transfer and remove heat from a product circuit or hot circuit (both not shown in FIG. 1) of condensing heat exchanger 123. The product circuit (not shown in FIG. 1) of condensing heat exchanger 123 may be fluidly connected to adsorptive separator 101, first regeneration zone 120, a portion of contactor 102 within first regeneration zone 120, optionally the second regeneration zone 130 and a portion of contactor 102 within second regeneration zone 130, optionally a compressor (not shown in FIG. 1), an end user for a purified or compressed second product stream (not shown in FIG. 1) and optionally a condensate tank, source or end use (all not shown in FIG. 1). In one aspect, at least a portion of second product stream 122 may be recovered from first regeneration zone 120, for example, from a first end 104 of a portion of contactor 102 within first regeneration zone 120, and adsorptive separator 101, and admitted in a product circuit (not shown in FIG. 1) of condensing heat exchanger 123, such as to reduce the temperature of and/or remove heat from second product stream 122, causing condensable components, for example, third component or $H_2O$, to at least partially condense and separate from second product stream 122, forming a condensate stream 124 and a purified second product stream 125. In one such aspect, as the condensable component condenses, a reduction in pressure or a vacuum may be induced in the product circuit (not shown in FIG. 1) of condensing heat exchanger 123, and fluidly connected passages and/or components, for example, first regeneration zone 120 of adsorptive separator 101, optionally second regeneration zone 130 of adsorptive separator 101, and at least a portion of contactor 102 within first regeneration zone 120 and optionally second regeneration zone 130. In such an aspect, the reduction in pressure or vacuum may advantageously enable vacuum assisted desorption of components, for example, first component and/or third component, adsorbed on the at least one adsorbent material (not shown in FIG. 1) in a portion of contactor 102 within first regeneration zone 120 and/or optionally second regeneration zone 130. In a further such embodiment, product circuit (not shown in FIG. 1) of condensing heat exchanger 123 may be fluidly connected to direct and admit condensate stream 124 into, for example, an optional pump and a condensate tank, source or end use (all not shown in FIG. 1), and purified second product stream 125 into a purified or compressed second product stream end use or user (all not shown in FIG. 1) via an optional one or more pumps (such as, for example, an ejector, a vacuum pump, or a single stage or multistage compressor operating optionally at sub-ambient inlet pressure), an optional one or more valves (such as for example, a check valve or a throttling valve), optional at least one additional condensing heat exchangers and/or condenser stages, and optional compressor for increasing the pressure of the purified second product stream. Optionally, condensing heat exchanger 123 may be fluidly connected to direct and admit at least a portion of purified second product stream 125 into an optional heater or optional auxiliary heat exchanger (both not shown in FIG. 1) and into adsorptive separator 101, second regeneration zone 130 and a portion of contactor 102 within second regeneration zone 130 as at least a portion of a second regeneration stream (not shown in FIG. 1).

In another system according to an embodiment of the present disclosure, at least a portion of a multi-component fluid mixture or feed stream 107 may be admitted as at least a portion of a second regeneration stream 131 into adsorptive separator 101, second regeneration zone 130 and a portion of contactor 102 within second regeneration zone 130, to flow in a direction substantially from first end 104 to second end 105 of contactor 102, or in a substantially co-current flow direction in relation to the direction of flow of feed stream 111. Second regeneration stream 131 may comprise, for example, first component, second component and/or third component, where at least one component, for example, a third component, comprises a partial pressure, or concentration less than an equilibrium partial pressure of the at least one component, for example, a third component, adsorbed on the at least one adsorbent material in a portion of contactor 102 within second regeneration zone 130. In one such embodiment, second regeneration stream 131 may also comprise a temperature equal to or greater than a third temperature threshold, for example, about the condensation temperature of second regeneration stream 131. An optional heat exchange device (not shown in FIG. 1), for example, a heat recovery steam generator, a heat exchanger or a heater (all not shown in FIG. 1), may be fluidly connected and employed between the feed source, for example, a combustor (not shown in FIG. 1), and adsorptive separator 101 or second regeneration zone 130 of adsorptive separator 101, to increase or decrease the temperature of second regeneration stream 131 to a suitable temperature for employment as a second regeneration stream. In one aspect according to the present disclosure, as second regeneration stream 131 flows in a portion of contactor 102 within second regeneration zone 130, a partial pressure swing and/or a humidity swing may cause the at least one component, for example, third component, adsorbed on the at least one adsorbent material (not shown in FIG. 1) within second regeneration zone 130 to at least partially desorb. A portion of second regeneration stream 131 and/or desorbed components, for example, third component and first component, may form a third product stream 132 which may be enriched in at least one component, for example, the third and optionally the first component, relative to feed stream 111. Third product stream 132 may be recovered from second end 105 of a portion of contactor 102 within second regeneration zone 130, second regeneration zone 130, adsorptive separator 101, and adsorptive system 100. Optionally, second regeneration zone 130, and adsorptive separator 101 may be fluidly connected to direct and admit at least a portion of third product stream 132 into adsorption zone 110 of adsorptive separator 101 as a portion of a feed stream 107 or feed stream 111, or into the multicomponent fluid stream source or feed source (not shown in FIG. 1), for example, a combustor (not shown in FIG. 1) as a portion of an oxidant stream employed for combustion and production of the combustion gas stream.

In an alternative system according to an embodiment of the present disclosure, at least a portion of contactor 102, second regeneration zone 130, and adsorptive separator 101 may be fluidly connected to an optional compressor (not shown in FIG. 1) employed to increase the pressure of purified second product stream 125, for example, an interstage of a multistage compressor (not shown in FIG. 1) or downstream of the optional compressor (not shown in FIG. 1), to recover and admit a fluid stream enriched in the first component relative to feed stream 111 (for example, at least a portion of a compressed second product stream), for employment as at least a portion of a second regeneration stream (not shown in FIG. 1). In a further such alternative system according to an embodiment of the present disclosure, adsorptive separator 101 may comprise additional zones, for example, a pre-regeneration zone and a reflux zone (both not shown in FIG. 1) where adsorptive separator 101 may be configured having the reflux zone (not shown in FIG. 1), adjacent to and prior to the adsorption zone 110, for example, adsorption zone 110, a pre-regeneration zone (not shown in FIG. 1), first regeneration zone 120, second regeneration zone 130, optional conditioning zone 140 and a reflux zone (not shown in FIG. 1), or adsorptive separator 101 may be configured having the reflux zone (not shown in FIG. 1), adjacent to and subsequent to the adsorption zone 110, for example, adsorption zone 110, a reflux zone (not shown in FIG. 1), a pre-regeneration zone (not shown in FIG. 1), first regeneration zone 120, second regeneration zone 130, and optional conditioning zone 140. In a further such embodiment, the pre-regeneration zone (not shown in FIG. 1) of adsorptive separator 101 and adsorptive system 100 may be fluidly connected to receive, for example, a pre-regeneration stream (not shown in FIG. 1) from a pre-regeneration stream source (not shown in FIG. 1), and/or at least a portion of first regenerating stream 121 from a first regeneration stream source (not shown in FIG. 1). Additionally, in a further aspect, the pre-regeneration zone (not shown in FIG. 1) of adsorptive separator 101 may be fluidly connected to recover a heavy reflux stream (not shown in FIG. 1) from the pre-regeneration zone (not shown in FIG. 1) and optionally adsorptive separator 101, and admit the heavy reflux stream (not shown in FIG. 1) optionally into adsorptive separator 101 and into reflux zone (not shown in FIG. 1) of adsorptive separator 101. An optional fifth product stream may be recovered from the reflux zone (not shown in FIG. 1), adsorptive separator 101 and adsorptive system 100. In a further such alternative system according to an embodiment of the present disclosure, adsorptive separator 101 may comprise additional pressure equalization zones, for example, at least one depressurization zone and at least one pressurization zone (both not shown in FIG. 1) where adsorptive separator 101 may be configured having the depressurization zone (not shown in FIG. 1) subsequent to adsorption zone 110 and prior to first regeneration zone 120, while pressurization zone (not shown in FIG. 1) may be subsequent to first regeneration zone 120 and prior to adsorption zone 110. For example, adsorptive separator 101 may optionally be configured with the following sequence of zones: adsorption zone 110, depressurization zone (not shown in FIG. 1), first regeneration zone 120, second regeneration zone 130, pressurization zone (not shown in FIG. 1), and optional conditioning zone 140; or adsorption zone 110, a depressurization zone (not shown in FIG. 1), first regeneration zone 120, pressurization zone (not shown in FIG. 1), second regeneration zone 130, optional conditioning zone 140. In a further such embodiment, the pressurization zone (not shown in FIG. 1) of adsorptive separator 101 may be fluidly connected to receive, for example, a pressure equalization stream (not shown in FIG. 1) from depressurization zone. Additionally, in a further aspect, a depressurization zone may be fluidly connected to admit a pressure equalization stream (not shown in FIG. 1) into a plurality of pressurization zones (not shown in FIG. 1).

In a particular aspect, a coolant source, for example, ambient air, may be fluidly connected to a fan or a blower (not shown in FIG. 1), to admit a conditioning stream 141, for example, an air stream, at a temperature equal to or less than a first temperature threshold (such as, for example, about 50° C., or in particular about 40° C., or more particularly about 30° C.), into adsorptive system 100, adsorptive separator 101, conditioning zone 140, and a portion of contactor 102 within conditioning zone 140, to flow in a direction substantially from first end 104 to second end 105 of contactor 102, or in a substantially co-current flow direction in relation to the direction of flow of the feed stream or combustion gas stream 111. In one such aspect, as conditioning stream 141 flows in a portion of contactor 102 within conditioning zone 140, conditioning stream 141 may increase or reduce the temperature of the at least one adsorbent material in conditioning zone 140 and/or purge components from the at least one adsorbent material, a portion of contactor 102 in conditioning zone 140, and conditioning zone 140. Conditioning stream 141 and/or desorbed or residual components may form a fourth product stream 142 which may be recovered from second end 105 of a portion of contactor 102 within conditioning zone 140, conditioning zone 140, adsorptive separator 101, and adsorptive system 100. In a further such aspect, conditioning zone 140, adsorptive separator 101, and adsorptive system 100 may be fluidly connected to direct and admit fourth product stream 142 to, for example, into the feed source (not shown in FIG. 1), for example, a combustor (not shown in FIG. 1) as a portion of an oxidant stream for the combustor, or a stack (not shown in FIG. 1) for dispersion and release into the atmosphere.

Figure 2:
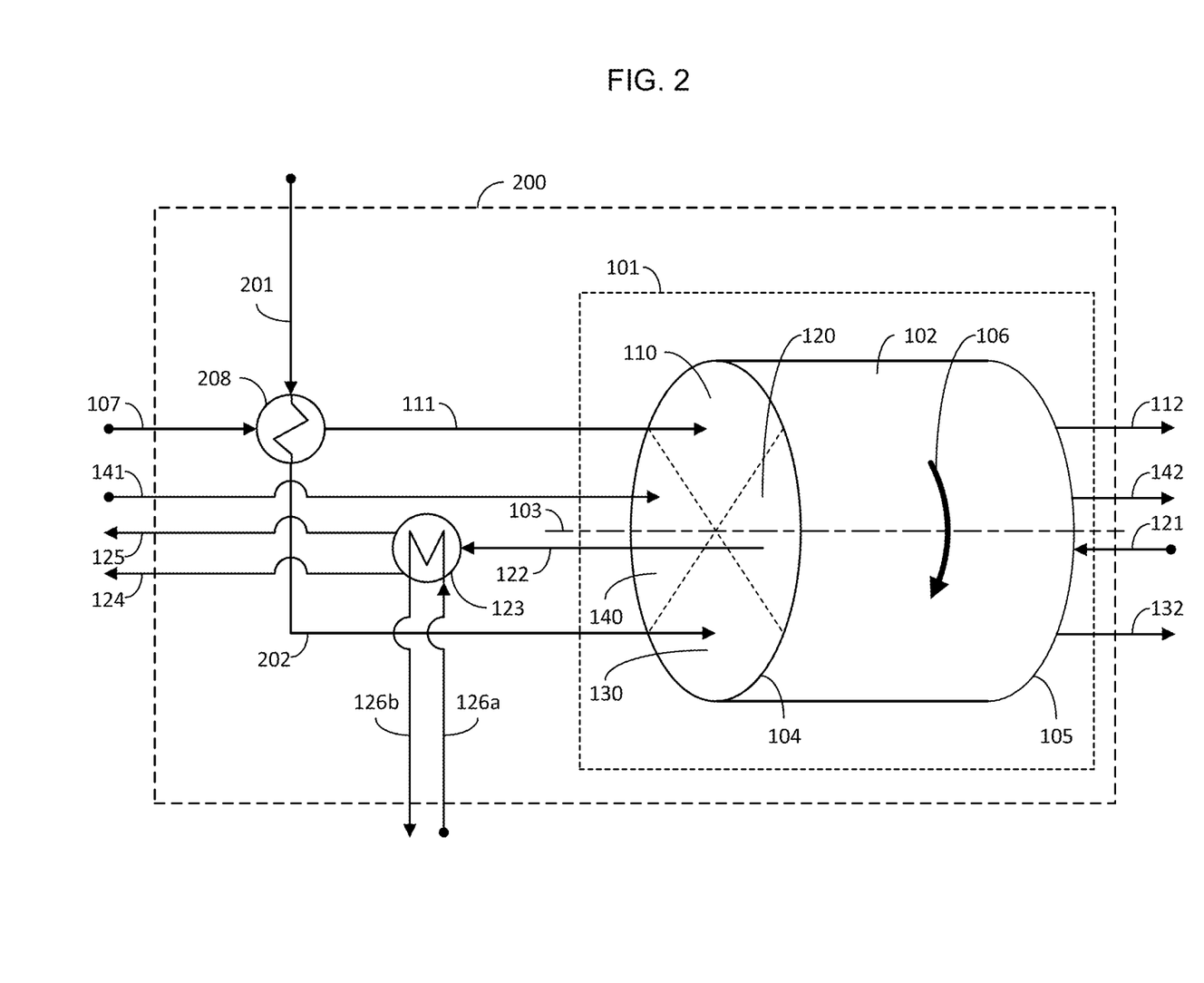
FIG. 2 is a simplified schematic diagram illustrating an adsorptive gas separation system or adsorptive separation system according to an alternative embodiment, comprising an optional gas-to-gas heat exchanger, an adsorptive gas separator or adsorptive separator and a condensing heat exchanger. The adsorptive gas separator is fluidly connected to a gas-to-gas heat exchanger where heat from the feed stream of the adsorptive separation system is employed to increase the temperature of an air stream to a suitable temperature for employment as a second regeneration stream.

FIG. 2 is a simplified schematic diagram illustrating an adsorptive gas separation system or adsorptive system according to an alternative embodiment of the present disclosure, comprising an optional heat exchanger or a gas-to-gas heat exchanger 208, an adsorptive gas separator or adsorptive separator 101, comprising a moving contactor 102, and a condenser or specifically a condensing heat exchanger 123. In a particular such embodiment, the exemplary adsorptive gas separator is configured having a single contactor cycling or rotating around an axis through four stationary zones, suitable for the alternative embodiment adsorptive gas separation process described above. The adsorptive separator is fluidly connected to a gas-to-gas heat exchanger where heat from the feed stream of the adsorptive separation system may be employed to increase the temperature of an air stream, such as to a suitable temperature for employment as a second regeneration stream.

Referring to FIGS. 1 and 2, in one embodiment of the present disclosure, an adsorptive gas separation system or adsorptive system 200 illustrated in FIG. 2 is substantially similar to an alternative embodiment adsorptive gas separation system or adsorptive system 100 illustrated in FIG. 1, however adsorptive system 100 in FIG. 1 employs a direct contact cooler 108 to reduce the temperature of a multi-component fluid mixture or feed stream 107, forming feed stream 111, whereas, adsorptive system 200 in FIG. 2 employs a gas-to-gas heat exchanger 208 to reduce the temperature of a multi-component fluid mixture or feed stream 107. Like reference numerals refer to corresponding parts throughout FIGS. 1 and 2.

Referring to FIG. 2, in an alternative system according to an embodiment of the present disclosure, an adsorptive gas separation system or an adsorptive system 200 comprises an optional heat exchanger, for example, a gas-to-gas heat exchanger 208 having a product circuit or a hot circuit (not shown in FIG. 2) and a cooling circuit or cold circuit (not shown in FIG. 2), a condensing heat exchanger 123, and an exemplary adsorptive gas separator or adsorptive separator 101, comprising an enclosure (not shown in FIG. 2) and a contactor 102. A feed stream source, for example, a fuel combustor (not shown in FIG. 2), may be fluidly connected to admit a multi-component fluid mixture or a feed stream 107 into adsorptive system 200 and the hot circuit (not shown in FIG. 2) of gas-to-gas heat exchanger 208, to reduce the temperature of feed stream 107, to equal to or less than a first temperature threshold (such as, for example, about 50° C., or in particular about 40° C., or more particularly about 30° C.), forming a feed stream 111. Hot circuit (not shown in FIG. 2) of gas-to-gas heat exchanger 208 may be fluidly connected to admit feed stream 111 into adsorptive separator 101, adsorption zone 110 and a portion of contactor 102 within adsorption zone 110, to flow in a direction substantially from first end 104 to second end 105 of contactor 102.

In a system according to an alternative embodiment, a second regeneration stream source, for example, ambient air (both not shown in FIG. 2, may be fluidly connected via an air blower or fan (not shown in FIG. 2), to admit a second regeneration stream 201, for example, an air stream, into adsorptive system 200 and the cold circuit (not shown in FIG. 2) of gas-to-gas heat exchanger 208, such as to increase the temperature of second regeneration stream 201 to a temperature suitable for a desorption of the at least one adsorbent material in second regeneration zone 130, for example, equal to or greater than a third temperature threshold, forming a second regeneration stream 202. Cold circuit (not shown in FIG. 2) of gas-to-gas heat exchanger 208 may be fluidly connected to admit second regeneration stream 202 into adsorptive separator 101, second regeneration zone 130 and a portion of contactor 102 within second regeneration zone 130, to flow in a direction substantially from first end 104 to second end 105 of contactor 102, or in a substantially co-current flow direction in relation to the direction of flow of the feed stream or combustion gas stream 111. In one such embodiment, second regeneration stream 202 may be actively or passively controlled to maintain a relative humidity below a humidity threshold or a partial pressure to saturation pressure. In a particular such embodiment, second regeneration stream 202 may be controlled to maintain a relative humidity or partial pressure to saturation pressure of, for example, less than about 1, or in particular less than about 0.5, or more particularly, less than about 0.1. Second regeneration stream 202 may have a low humidity relative to the humidity in a portion of contactor 102 within second regeneration zone 130. In a further embodiment, as second regeneration stream 202 flows into adsorptive separator 101, second regeneration zone 130, and a portion of contactor 102 within second regeneration zone 130, second regeneration stream 202 may desorb, displace, and purge at least a portion of component(s), for example, first component and third component, adsorbed on the at least one adsorbent material. A portion of second regeneration stream 202 and/or desorbed components, for example, first component and third component, may form a third product stream 132 which may be enriched in the third component and/or first component relative to feed stream 111. Third product stream 132 may be recovered from second end 105 of a portion of contactor 102 within second regeneration zone 130, second regeneration zone 130, adsorptive separator 101, and optionally adsorptive system 100. Optionally, second regeneration zone 130 and adsorptive separator 101 and optionally adsorptive system 100 may be fluidly connected to a hot circuit (not shown in FIG. 2) of gas-to-gas heat exchanger 208, and/or a first regeneration zone 110 of adsorptive separator 101, such as to admit at least a portion of third product stream 132 as a portion of feed stream 107, or as a portion of feed stream 111, or fluidly connected to the feed source (not shown in FIG. 2), to admit at least a portion of third product stream 132 as, for example, at least a portion of an oxidant stream employed for the combustor.

Figure 3:
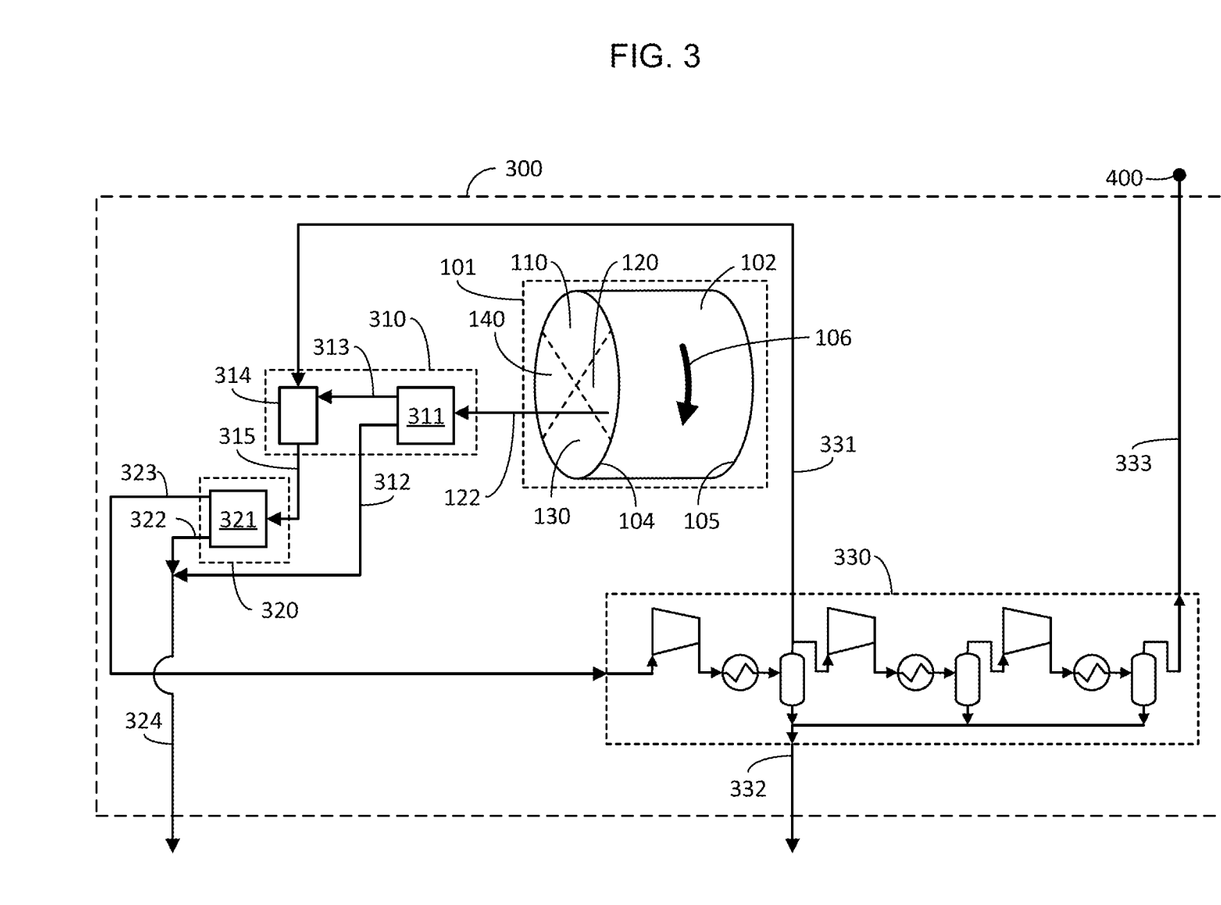
FIG. 3 is a simplified schematic diagram illustrating an adsorptive gas separation system according to a further embodiment, comprising an adsorptive gas separator, a first condenser stage, a second condenser stage, and a multistage compressor. The first condenser stage comprises a first stage condensing heat exchanger, and an ejector, and the second condenser stage comprise a condensing heat exchanger.

FIG. 3 is a simplified schematic diagram illustrating an exemplary embodiment adsorptive gas separation system or adsorptive system 300, comprising: an adsorptive gas separator or adsorptive separator 101, a first condenser stage 310, a second condenser stage 320, and a compressor or multistage compressor 330. In one such embodiment, adsorptive separator 101 is substantially similar to adsorptive separator 101 illustrated in FIGS. 1 and 2 and described in further detail above, which comprises, an enclosure (not shown in FIG. 3), a contactor 102, an adsorption zone 110, a first regeneration zone 120, a second regeneration zone 130 and a conditioning zone 140, a first end 104 and a second end 105. First regeneration zone 120 of adsorptive separator 101 may be fluidly connected to first condensing stage 310, a product or hot circuit (not shown in FIG. 3) of a first stage condensing heat exchanger 311, a first stage ejector 314, a second condensing stage 320, a product or hot circuit (not shown in FIG. 3) of a second stage condensing heat exchanger 321, a multistage compressor 330, and an end use 400. A cooling or cold circuit (not shown in FIG. 3) of first stage condensing heat exchanger 311 and a cooling or cold circuit (not shown in FIG. 3) of second stage condensing heat exchanger 321 may be fluidly connected to at least one coolant source (not shown in FIG. 3). In one aspect, at least one coolant stream, for example, a water stream, (all not shown in FIG. 3) may be recovered from at least one coolant source (not shown in FIG. 3) and admitted into adsorptive separation system 300, first condensing stage 310, second condensing stage 320, the cold circuit (not shown in FIG. 3) of first stage condensing heat exchanger 311 and second stage condensing heat exchanger 321, such as to remove heat, reduce the temperature, and cause condensable components to condense in the product or hot circuits (not shown in FIG. 3) of first stage condensing heat exchanger 311 and a second stage condensing heat exchanger 321. In a further aspect, the at least one coolant stream (not shown in FIG. 3), may be recovered from the cold circuits of first stage condensing heat exchanger 311 and second stage condensing heat exchanger 321, first condensing stage 310, second condensing stage 320 and adsorptive separation system 300. Second product stream 122 may be recovered from a portion of contactor 102 in first regeneration zone 120 optionally via first end 104, first regeneration zone 120, adsorptive separator 101 and admitted into first condensing stage 310, or hot circuit (not shown in FIG. 3) of first stage condensing heat exchanger 311 where condensable components, for example, third component or $H_2O$, may condense, forming a condensate stream 312 and a purified second product stream 313 high in purity while inducing a pressure drop or a vacuum within, for example, hot circuit (not shown in FIG. 3) of first stage condensing heat exchanger 311, first regeneration zone 120, a portion of contactor 102 within first regeneration zone 120, and fluidly connected passages upstream of first regeneration zone 120 (not shown in FIG. 3) and adsorptive separator 101. In one such embodiment, inducing a pressure drop or a vacuum may advantageously assist in desorbing the components adsorbed on the at least one adsorbent material in a portion of contactor 102 in first regeneration zone 120 and reduce the consumption of steam during the regeneration process and first regeneration step. In a particular such embodiment, purified second product stream 313 may be recovered from hot circuit (not shown in FIG. 3) of first stage condensing heat exchanger 311 and admitted into a low pressure port (not shown in FIG. 3) of first stage ejector 314. Multistage compressor 330 is fluidly connected, for example, after a first compression stage, between compression stages, or downstream to multistage compressor 330, to a high pressure port (not shown in FIG. 3) of first stage ejector 314 to recover, and admit at least a portion of a compressed second product stream 331 as a motive stream for first stage ejector 314, which may further reduce the pressure and/or assist in maintaining the reduced pressure or vacuum in hot circuit (not shown in FIG. 3) of first stage condensing heat exchanger 311, at least a portion of adsorptive separator 101, first regeneration zone 120, a portion of contactor 102 in first regeneration zone 120, and fluidly connected passages upstream of adsorptive separator 101. In a particular aspect, a combined second product stream 315 may be recovered from first stage ejector 314 and admitted into hot circuit (not shown in FIG. 3) of second stage condenser 321, where condensable components, for example, third component or $H_2O$, may condense, forming a condensate stream 322 and purified second product stream 323 higher in purity relative to purified second product stream 313 while further reducing the pressure and/or assist in maintaining the reduced pressure or vacuum in the fluidly connected passages, for example, first stage ejector 314, hot circuit (not shown in FIG. 3) of first stage condensing heat exchanger 311, at least a portion of adsorptive separator 101, first regeneration zone 120 and fluidly connected passages upstream of adsorptive separator. Second condenser stage 320 and product or hot circuit (not shown in FIG. 3) of second stage condenser 321 may be fluidly connected to multistage compressor 330 where purified second product stream 323 may be recovered from hot circuit (not shown in FIG. 3) of second stage condenser 321, second condenser stage 320, and admitted into multistage compressor 330. In one such aspect, multistage compressor 330 may optionally operate at a sub-ambient inlet pressure, for example, less than about 100 $kPa_{abs}$ (or for example, between about 70-100 $kPa_{abs}$, dependent upon factors such as but not limited to the location, elevation, conditions and temperature of the ambient environment at a particular location) and increase the pressure of purified second product stream 323 to produce compressed second product stream 333 which may be recovered from multistage compressor 330 and admitted to end use 400. A condensate stream 312 may be recovered from cold circuit (not shown in FIG. 3) of first stage condensing heat exchanger 311 and first condensing stage 310, while a condensate stream 322 may be recovered from cold circuit (not shown in FIG. 3) of second stage condensing heat exchanger 321 and second condenser stage 320 optionally with at least one pump (not shown in FIG. 3) and optionally combined to form a condensate stream 324, which may be recovered from adsorptive system 300. In one aspect, a condensate stream 332, produced by compressor 330, may be recovered from compressor 330 and adsorptive system 300. Optionally, additional condensing heat exchangers, condenser or condensing heat exchangers stages, pumps and valves, for example, check valves or throttling valves, (all not shown in FIG. 3) fluidly connected optionally in series may be employed. Optionally, multistage compressor 330 may be fluidly connected, for example, after a first compression stage, between compression stages, or downstream of multistage compressor 330, to first regeneration zone 120 or second regeneration zone 130 optionally via an auxiliary heater or auxiliary heat exchanger, where at least a portion of a compressed second product stream (such as for example, at least a portion of compressed second product stream 331 recovered from an interstage of multistage compressor 330 or at least a portion of compressed second product stream 333 recovered downstream of multistage compressor 330), may be employed as at least a portion of a regeneration stream, for example, as at least a portion of a first and/or a second regeneration stream. In one such aspect, the auxiliary heater or auxiliary heat exchanger may increase the temperature of at least a portion of the compressed second product stream, such as to a temperature suitable for regeneration of the at least one adsorbent material or a temperature suitable for a regeneration stream in, for example, first regeneration zone 120 and/or second regeneration zone 130. Optionally multistage compressor 330 may be fluidly connected to second end 105 of a portion of contactor 102 in first regeneration zone 120 and/or second regeneration zone 130.

Any adsorptive separator or adsorptive contactor described in any of the above-detailed embodiments may employ any suitable adsorbent materials including but not limited to, for example, desiccant, activated carbon, graphite, carbon molecular sieve, activated alumina, molecular sieve, aluminophosphate, silicoaluminophosphate, zeolite adsorbent, ion exchanged zeolite, hydrophilic zeolite, hydrophobic zeolite, modified zeolite, natural zeolites, faujasite, clinoptilolite, mordenite, metal-exchanged silico-aluminophosphate, uni-polar resin, bi-polar resin, aromatic cross-linked polystyrenic matrix, brominated aromatic matrix, methacrylic ester copolymer, carbon fiber, carbon nanotube, nano-materials, metal salt adsorbent, perchlorate, oxalate, alkaline earth metal particle, ETS, CTS, metal oxide, supported alkali carbonates, alkali-promoted hydrotalcites, chemisorbent, amine, organo-metallic reactant, and metal organic framework adsorbent materials, and combinations thereof.

The exemplary embodiments herein described are not intended to be exhaustive or to limit the scope of the invention to the precise forms disclosed. They are chosen and described to explain the principles of the invention and its application and practical use to allow others skilled in the art to comprehend its teachings.

As will be apparent to those skilled in the art in light of the foregoing disclosure, many alterations and modifications are possible in the practice of this invention without departing from the scope thereof. Accordingly, the scope of the invention is to be construed in accordance with the substance defined by the following claims.

What is claimed is:

1. An adsorptive gas separation process for separating at least a portion of a multi-component fluid mixture into one or more components, said adsorptive gas separation process comprising:
    a. admitting said multi-component fluid mixture as a feed stream into at least one contactor; adsorbing at least a portion of a first component of said feed stream on at least one adsorbent material in said at least one contactor; recovering a first product stream further comprising at least a second component and depleted in said first component relative to said feed stream from said at least one contactor;
    b. admitting a first regeneration stream further comprising at least a third component into said at least one contactor; desorbing at least a portion of said first component adsorbed on said at least one adsorbent material in said at least one contactor; recovering a second product stream enriched in said first component relative to said feed stream from said at least one contactor;
    c. actively controlling a partial pressure of a second regeneration stream; and
    d. admitting said second regeneration stream into said at least one contactor; desorbing at least a portion of said third component adsorbed on said at least one adsorbent material in said at least one contactor, and recovering a third product stream from said at least one contactor.

2. The process of claim 1, wherein said temperature of said second regeneration stream is equal to or greater than a condensation temperature of said second regeneration stream.

3. The process of claim 1, further comprising after step (d):

admitting a conditioning stream into said at least one contactor; reducing a temperature of said at least one adsorbent material in said at least one contactor, and recovering a fourth product stream from said at least one contactor.

4. The process of claim 1, wherein said steps (a) through (d) occur simultaneously.

5. The process of claim 1, wherein said multi-component fluid mixture is a combustion gas stream.

6. The process of claim 1, wherein said first component is carbon dioxide.

7. The process of claim 1, wherein said third component is water.

8. The process of claim 1, further comprising admitting said second product stream into a condenser, condensing said third component causing a reduction in pressure in said condenser and said at least one contactor.

9. The process of claim 1, further comprising prior to step (a), admitting said multi-component fluid mixture into a heat transfer device, reducing said multi-component fluid mixture to a temperature equal to or less than 50° C.

10. The process of claim 1, wherein said third product stream is admitted as a portion of said feed stream admitted into said at least one contactor.

11. The process of claim 1, further comprising prior to step (b), admitting a pre-regeneration stream into said at least one contactor, desorbing at least a portion of a diluent co-adsorbed on said at least one adsorbent material in said at least one contactor, recovering a reflux stream, and recycling said reflux stream to said contactor.

12. The process of claim 1, further comprising during step (a), admitting a portion of said first product stream into said at least one contactor as a portion of said feed stream.

* * * * *